Figure 1:
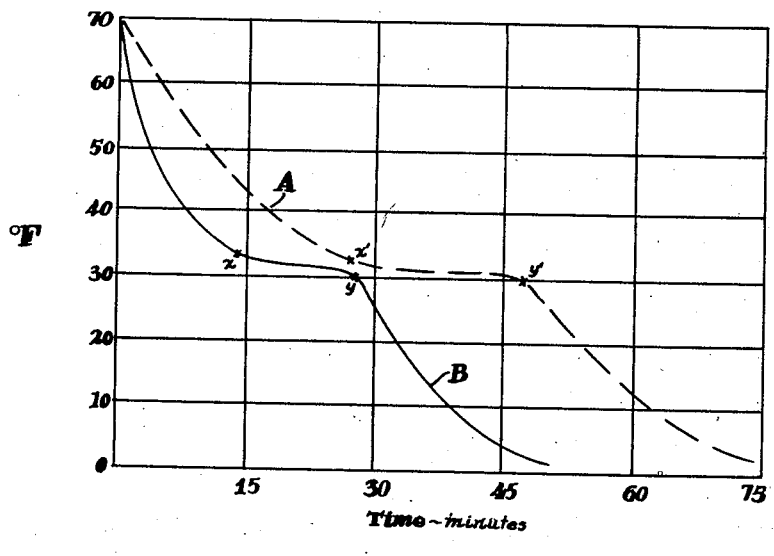

Nov. 7, 1950  G. HAMMOND ET AL  2,529,388
PROCESS FOR ACCELERATING THE FREEZING OF FOODS
Filed Nov. 4, 1946

Gordon Hammond
Raymond E. Jacke
INVENTORS

Patented Nov. 7, 1950

2,529,388

UNITED STATES PATENT OFFICE 2,529,388

PROCESS FOR ACCELERATING THE FREEZING OF FOODS

Gordon Hammond, Ashland, and Raymond E. Jacke, Richmond, Va., assignors to Reynolds Metals Company, Richmond, Va., a corporation of Delaware Application November 4, 1946, Serial No. 707,588

2 Claims. (Cl. 99—192)

This invention has to do with the art of producing frozen foods, that is, foodstuffs which are frozen as a part of their preparation, and maintained in the frozen state until, or substantially until, they are received in the hands of the ultimate consumer. The general advantages which inhere in the use of quick freezing in preparing and transporting foodstuffs are dealt with in numerous prior patents, and hence will not be repeated here except as may be necessary to an understanding of our present invention.

In a copending application of Gordon Hammond, Serial No. 606,801, filed July 24, 1945, there is disclosed a novel package, of thin aluminum foil, which is adapted to the requirements of the food industries by reason of characteristics set forth in such application. We have discovered, however, that the use of such a package, or one broadly similar thereto, as will appear hereinafter, in connection with a certain novel process of treatment to be disclosed, affords important advantages from the point of view of the freezing and storage of the package and its contents, quite apart from the merits of that particular kind of package as such.

It is an object of our invention to provide a method of freezing foodstuffs which will greatly reduce the time required for the freezing process. Two principal advantages result from the satisfaction of this aim: first, the cost of freezing is reduced, since the same equipment is able to handle a larger quantity of material in a given time, and second, the quality of the frozen product is improved, in accordance with the well-known principle that the quicker the freezing can be accomplished, particularly during the critical period when the material is passing through its freezing point, the greater is the freedom from objectionable crystallization and other effects associated with slow freezing.

A further object of our invention is to provide a process of operations which will greatly reduce or entirely eliminate the dehydration of the food product, both during the shortened freezing period, and, what is more important, during prolonged periods of storage under low humidity conditions such as obtain in conventional frozen food storage chambers. This dehydration, which is permitted by all prior art processes of frozen food packaging known to us, is objectionable not only because of the loss of weight of the food product which it entails, but also because the drying of the product seriously and adversely affects the quality and palatability of the product when finally prepared for use.

An additional object of our invention is to provide, in a process as just described, an order of treatment which will reduce to a minimum the handling of the foodstuff, both before and after its packaging, and hence will be more efficient and economical than the processes heretofore practiced.

A further object of our invention is to devise a process of freezing foodstuffs and the like which can be carried out with very few or no changes in existing equipment, whereby the cost of operating in accordance with our novel process is still further reduced, as compared with any process which requires quantities of special equipment or machinery.

Figure 2:
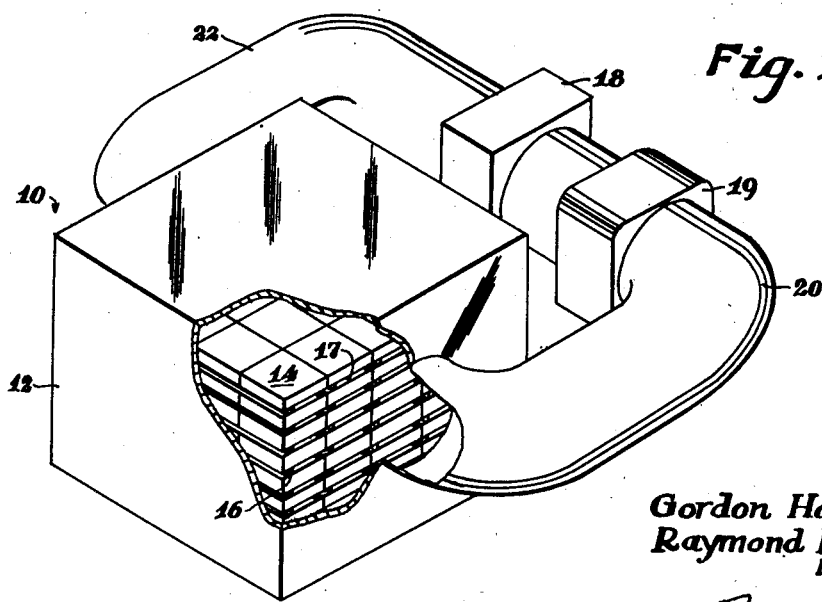

Other objects and advantages of our improved process will become apparent from the following description of a preferred manner of carrying out the same, taken in connection with the accompanying drawings, in which Figure 1 represents diagrammatically the time-temperature curves in accordance with prior art freezing methods and that disclosed herein, and Figure 2 is a schematic perspective view, partly broken away, of a representative apparatus for carrying out the freezing step of our process.

The principal prior art methods of producing frozen foods in packages suitable for retail distribution comprise loading the material to be frozen in paperboard containers with a lining of cellophane or the like to protect the paperboard against soaking water from the product, wrapping the paperboard container in an outer paper cover bearing printing or the like, closing the composite container, and then subjecting it to freezing either by contact under pressure against refrigerated plates, or by assembling a stack of such containers in a cold room and freezing the stack as a unit, either with or without a circulating atmosphere of cold air. Alternatively, the commodities are first frozen in bulk or in suitable sized blocks (cellophane wraps being occasionally used to preserve the shape of the blocks prior to freezing), and then loaded into the paperboard containers. Where the wrapping or packaging is completed prior to the freezing step, it is clear that the two or three layers of packaging material between the contents of the package and the freezing medium constitute a fairly effective heat barrier preventing the attainment of a maximum freezing speed, while if the product is first frozen, considerable costly handling of the product must be accomplished before it is ready for distribution.

In the case of freezing through the multilayer type of package referred to above, the insulation value of the barrier is not merely that due to the relatively low thermal conductivities of the materials, but is aggravated by the well-known "skin effect" at each interface between two different media. In other words, at each transition layer (e. g., from cold air to paper wrap, paper wrap to air, air to cardboard, et cetera) there exists an insulating skin of air adjacent the solid material, which produces a cumulative insulating effect far greater than would result from a mere addition of the insulating effects of the separate layers measured as such. Our present invention takes advantage of the self-sustaining character, printability and resistance to moisture-vapor transmission of thin metal foils, such as quarter- and half-hard aluminum foils of calipers upwards of .0025 inch, to eliminate all the intermediate wraps of the prior art, and to provide an overall thermal transmissivity or conductivity which is greatly in excess of that which would result merely from the substitution of such a foil for the primary container material, such as paperboard or cardboard, of the prior art.

Due to the fact that the prior art methods outlined above necessarily subject the food products to atmospheric conditions of very low humidity, considerable dehydration of the product is likely to occur, since the wrappers used are pervious to moisture-laden air contained in the filled but unfrozen packages. Additional dehydration occurs, together with objectionable losses of weight, during cold storage of such products, with consequent shrinkage and other difficulties, such as loss of flavor and improper appearance of the product when the package is opened.

In accordance with our invention, the food product is loaded into a retail size, flat rectangular container of thin metal foil, of the general type disclosed in the application referred to above, and the container is then tightly, and substantially hermetically, sealed preferably by the use of folded seams, although other seals may be employed. By "flat rectangular" we mean a package whose major dimensions are two or more times the minor dimension. The filled packages are then frozen, either by contact between their larger surfaces and refrigerated plates, or by stacking them loosely in a cabinet through which cold air may be circulated at a high speed, the arrangement of the packages being such as to permit the air to contact as much as possible of the large, flat faces of each package. In the latter case, suitable spacers or wooden trays may be used to hold the layers of packages and provide the desired interstices for the movement of the cold air. After freezing, which is accomplished in from 30 to 50 percent of the time required by prior art methods, the frozen packages need only be placed in suitable cartons holding the desired number, and distributed or stored as desired.

It will be understood that a suitable label or other indicia may be printed or lithographed directly upon the outer surface of the metal foil prior to forming up the package, so that no outer paper wrap is required.

Actual comparative tests on representative foods show the following freezing times for the prior art and the presently disclosed process:

|  | Initial Temp., °F | Cooling time (minutes) to 0° F | |
| --- | --- | --- | --- |
|  |  | Prior art | Present invention |
| Green peas | 62 | 98 | [1] 49 |
| Cut corn | 62 | 75 | [1] 43 |
| Peaches in syrup | 75 | 180 | [1] 46 |
| Cooked chop suey | 140 | 135 | [2] 60 |

[1] Refrigerated by contact with cold plates.
[2] Refrigerated by cold air blast (−40°).

Fig. 1 of the drawing represents the cooling curves of equivalent packages of food arranged in stacks in the same manner, the dashed line curve A being the cooling curve for prior art packages frozen in accordance with known methods, and the solid line curve B representing the cooling curve for thin-walled rectangular metallic packages cooled in accordance with our process. Both these curves are of the same general form, comprising substantially hyperbolic upper and lower limbs connected by the substantially horizontal portions located at the freezing point temperature of the food product. These relatively flat horizontal portions, in accordance with well-known principles, represent the time required to extract the heat of fusion of the material, which must be accomplished in order to freeze the material and permit proceeding to the lower temperatures desired for storage and shipment. It will be seen that not only does curve B show the percentage saving in overall cooling time, to a low temperature of 0° F., previously stated herein, but that a substantial portion of this saving in time is accomplished by a shortening of the horizontal portion of the curve, measured between similarly located points $x, y$ and $x', y'$ on the two curves. In other words, the use of our process not only accomplishes an unexpectedly short total freeezing time, but it also and concommitantly shortens the time during which the material is maintained at or near its freezing point, and during which crystallization, cell destruction and other undesirable effects are believed to be produced. Hence, the quality of the frozen material, as judged at the time of use, is noticeably superior to that of material frozen by the known methods.

We have found that comparative tests of the freezing of ordinary packages and packages in accordance with our invention and following our process herein disclosed show substantially no difference in freezing times when the packages are merely subjected to a cold temperature atmosphere which does not circulate past the packages. We believe this to be due to the fact that when a package is exposed in still cold air virtually the only way in which it can lose heat is by radiation. Metallic foils are notably heat reflective. The contents of the package constitutes a warm body and the heat of the contents, except such as is in contact with the walls, is transmitted to the walls by radiation. The reflective character of the foil, therefore, retards the transmission of this radiant heat through the package walls. When, however, the major surfaces of the package are in direct contact with refrigerated plates the high thermal conductivity of the walls directly facilitates extraction of heat from the contents. Similarly a moving column of air sweeping across the surfaces of the package provides for removal of heat from the foil by conduction rather than merely by radiation. It will, of course, be understood that the advantages of substantially hermetically sealing an inherently vapor-proof material, to eliminate dehydration during freezing and subsequent storage and handling, are present regardless of whether the packages are frozen slowly or rapidly.

An important point in the use of metallic packages lies in the fact that the relatively narrow side walls (being highly conductive) act as conduits to transmit heat to the more directly refrigerated major surfaces. This makes the narrow walls very nearly as effective in refrigerating the contents as are the major walls, a phenomenon which cannot take place in the conventional package.

Fig. 2 of the drawing represents schematically and in perspective a representative embodiment of equipment by which our process may conveniently be carried out. In this figure, numeral 10 represents a freezing chamber of usual construction provided with insulating walls 12 to prevent loss of refrigerating capacity, and in which the packages 14 to be frozen are stacked in layers, adjacent layers being separated from one another as by laths or wooden strips 16 to provide channels 17 for the circulation of the refrigerated air. It is obvious that other arrangements of the packages are possible, as for example, the stacking of successive layers in checkerboard fashion, the sides of adjacent packages in each row being separated, and the packages in each layer above the bottom one being staggered with respect to those in the preceding layer. Alternatively, each layer of packages may be received in a tray or the like adapted to provide the desired spacing and facilitate handling. Refrigerated air is circulated from cooling mechanism 18 of any desired or well known type, through a conduit or pipe 20, by pump or fan 19 and into the chamber 10, and then recirculated through a conduit 22 located at the opposite end of the chamber. The walls 12 of the chamber may themselves be refrigerated if desired, and if sufficient cooling capacity is available at the walls themselves, it may be unnecessary to provide the external cooler 18, since the air may be maintained sufficiently cool merely by its repeated contact with the walls of the chamber.

It seems hardly necessary to mention that packages loaded into the chamber 10 should be externally dry, since the formation of a crust of ice or frost on the packages would seriously hamper the freezing operation, due to the relatively very low conductivity of such material. The circulating air should also be free of entrained water in any form; while the temperature of the air, after equilibrium has been reached, will cause any water vapor to be frozen out, particles of ice in the air stream may be melted and adhere to warm packages when first placed in the chamber, and subsequent freezing of such melted ice would produce the insulating layer referred to above.

It will be seen from the above disclosure that we have satisfied the objects of our invention by providing a process of freezing and handling food products in a particular way, and utilizing a package material of a thin metallic foil in a specific manner, but we wish it to be understood that the details disclosed herein may be varied in many respects without departing from the scope of our invention as defined in the appended claims.

We claim:

1. The process of preparing a frozen food product which comprises loading a quantity of the product to be frozen into a thin-walled, flat rectangular retail sized container of sufficient rigidity to be self sustaining and having major and minor dimensions, and being composed substantially entirely of a single thickness of aluminum foil of a caliper not substantially in excess of .005 inch nor substantially less than .003 inch closing the container substantially hermetically, and extracting heat predominantly by conduction through the larger surfaces of said container until the product has become frozen.

2. The process of preparing a frozen food product which comprises loading a quantity of the product to be frozen into a thin-walled, flat rectangular retail sized container having major and minor dimensions and being of sufficient rigidity to be self-sustaining and composed substantially entirely of a single thickness of aluminum foil of a caliper not substantially in excess of .005 inch nor substantially less than .003 inch closing the container substantially hermetically, and subjecting the larger walls of said container to thermally conductive contact with refrigerated surfaces for a sufficient time to freeze the product.

GORDON HAMMOND.
RAYMOND E. JACKE.

REFERENCES CITED

The following references are of record in the file of this patent:

UNITED STATES PATENTS

| Number | Name | Date |
|---|---|---|
| 1,710,386 | Taylor | Apr. 23, 1929 |
| 1,759,682 | Birdseye | May 20, 1930 |
| 1,939,109 | Davidson | Dec. 12, 1933 |
| 2,156,987 | Hill | May 2, 1939 |
| 2,237,257 | Finnegan | Apr. 1, 1941 |

FOREIGN PATENTS

| Number | Country | Date |
|---|---|---|
| 49,411 | Norway | 1931 |
| 2,785 | Australia | 1931 |

OTHER REFERENCES

Lovern, Food Manufacture, April 1948, pages 171 to 175.